Nov. 18, 1930.  M. G. P. PHILLIPS  1,781,701
MACHINE FOR REMOVING FLAGS AND OTHER ADHERING
LEAF FROM THE STALKS OF TOBACCO LEAVES
Filed Aug. 21, 1928   2 Sheets-Sheet 1

Inventor;
Morris Godfrey Philip Phillips,
Harold D. Penney

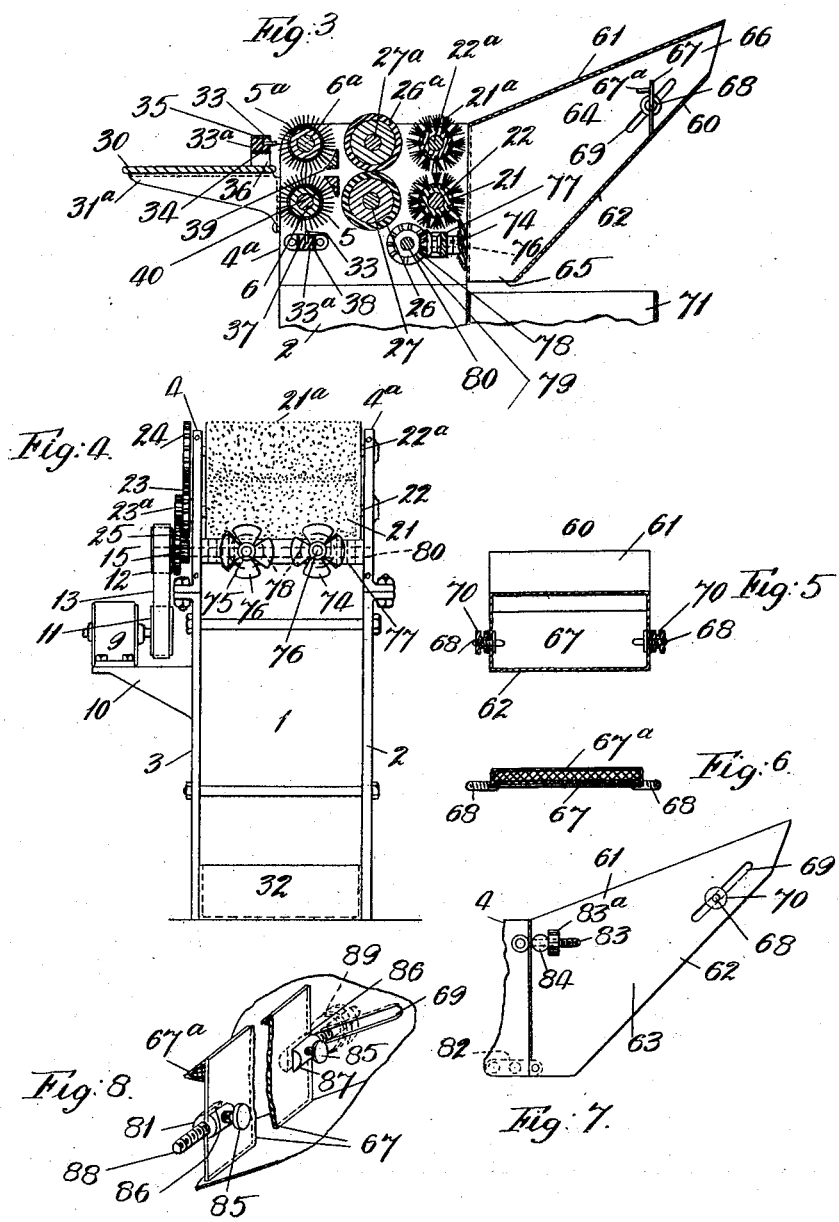

Patented Nov. 18, 1930

1,781,701

UNITED STATES PATENT OFFICE

MORRIS GODFREY PHILIP PHILLIPS, OF LONDON, ENGLAND

MACHINE FOR REMOVING FLAGS AND OTHER ADHERING LEAF FROM THE STALKS OF TOBACCO LEAVES

Application filed August 21, 1928, Serial No. 301,064, and in Great Britain May 16, 1928.

This invention relates to a machine for removing the flags and/or other adhering parts of the leaf from the stalks of tobacco leaves.

The present invention has for its object certain improvements in or modifications of machines of the type described in British specification No. 2683/28, and relates to the means for effecting the separation of the stem and flag portions of the leaves, after these leave the machine, in a manner such that a minimum of floor space is occupied, in as much as the stalks after treatment are led back towards the machine and the leaf portions are deflected in a vertical direction, instead of following a horizontal or substantially horizontal path.

A machine constructed in accordance with the above mentioned specification comprises one or more pairs of feed rollers preceded and followed by one or more pairs of rotary brushes, the speeds of the said preceding and following brushes being respectively lower and higher than the speed of the feed rollers.

According to the present invention the machine is provided at the exit end thereof with a box like body, having openings at its lower and upper extremities and having the bottom thereof inclined. Arranged at a point near the upper end of the aforesaid box like body is a plate or baffle, against which the stalks and leaf portions are projected as they are ejected from the machine. A current of air is caused to pass from the lower end through the body, whereby the stripped flag portions are blown over the baffle plate and out through the upper opening, whilst the stems owing to their greater weight pass down the inclined surface of the box like body and out through the lower opening thereof.

In order that the invention may be the better understood drawings are appended in which:—

Fig. 3 is a sectional view of line T—T Fig. 2.

Fig. 4 is an end view with certain parts removed.

Fig. 5 is a section on line W—W Fig. 1.

Fig. 6 is a plan of a certain part removed from the machine.

Fig. 7 is a side view showing a modification.

Fig. 8 is a perspective view showing a certain other modification.

Figure 1:
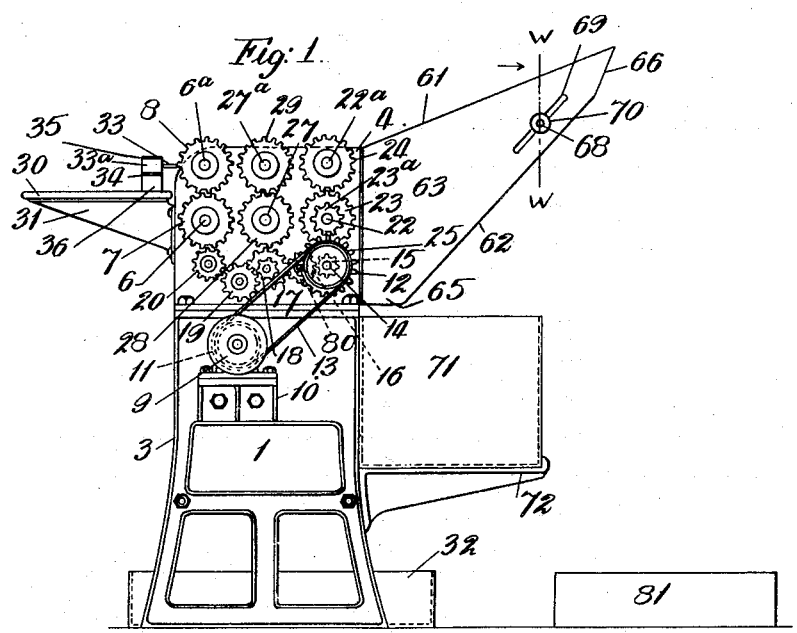
Fig. 1 is a side elevation of a machine embodying the present invention.
Figure 2:
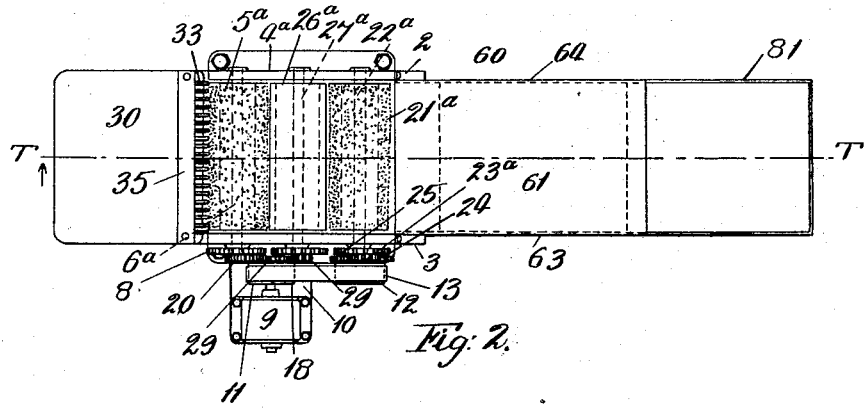
Fig. 2 is a plan.

Referring to the accompanying drawings, 1 indicates generally the frame of the machine comprised of side members 2 and 3 having bolted to the upper ends thereof plates 4 and 4ª respectively.

5, 5ª indicate rotary wire brushes disposed upon shafts 6, 6ª respectively, journalled at their ends in bearings formed in the plates 4, 4ª and extending at one end through the said bearings and having secured thereon at that end pinions 7 and 8 which intermesh.

A driving motor 9 is carried upon a bracket 10, motion being transmitted from a pulley 11 upon the shaft of the said motor by means of a belt 13 to a pulley 12. The pulley 12 is mounted upon a shaft 14, which shaft has mounted thereon a pinion 15, by means of which motion is imparted by way of an intermediate pinion 16, secured upon the outer end of a shaft 80 disposed transversely of the machine and carried in bearings formed in the plates 4, 4ª, to a train of gears 17, 18, 19 and 20 to the pinion 7 of the lower brush 5.

21, 21ª indicate a second pair of rotary brushes mounted respectively upon shafts 22, 22ª and journalled in the plates 4, 4ª, the said shafts projecting through the plate 4 at one end and having thereon pinions 23, 24 respectively which intermesh, a pinion 23ª being mounted upon shaft 22, which pinion engages with a pinion 25 disposed upon the shaft 14.

26, 26ª indicate rubber covered feed rollers disposed between the first and second pair of brushes and carried upon shafts 27, 27ª journalled in the plates 4, 4ª and extending through the plate 4 and having thereon intermeshing pinions 28, 29 respectively, the pinion 28 engaging with the pinion 17.

The speed of rotation of the first pair of brushes is lower than the speed of the feed rollers, and the speed of rotation of the second pair of brushes is greater than the speed of the said feed rollers.

30 indicates a table or belt upon which the stems are supported as they are fed into the machine, and which table is supported by means of brackets 31, 31ᵃ.

33 indicates a series of pins resiliently mounted in india-rubber or other suitable material 33ᵃ clamped between plates 34, 35, supported by pillars 36, 36 secured upon the table 30. A series of resiliently mounted pins similar to those above described are clamped between plates 37, 38 disposed beneath the lower brush 5, the purpose of these series of pins being to clean the brushes 5 and 5ᵃ of all adhering matter.

Disposed at the rear of the brushes 5, 5ᵃ are bars 39, 40, running transversely of the machine and secured at their ends to the plates 4, 4ᵃ, the said bars being for the purpose of stripping any adhering stem portions from the said brushes.

60 indicates a box like body comprised of upper and lower inclined walls 61, 62 respectively and side walls 63, 64, the said body being disposed at the exit of the machine and secured to the plates 4, 4ᵃ.

Disposed at the lower and upper ends of the body 60 are openings 65, 66 respectively.

67 indicates a baffle plate disposed within the upper portion of the body 60, the lower edge of which baffle plate abuts the inner face of the lower inclined wall 62, the upper edge thereof being in spaced relationship with the upper wall 61 of the said body.

67ᵃ indicates a wire grid or perforated body secured upon the inner face of the baffle 67 as shown in Figs. 3, 6 and 8, the function of the said grid being hereinafter described.

The baffle plate 67 is provided at its ends with screwed studs 68 which pass through slots 69 formed in the side walls 63, 64 of the body 60, suitable clamping nuts 70, 70 being provided upon the outer ends of the said studs to clamp the baffle plate firmly in position. The adjustment of the baffle plate longitudinally of the body 60 can be readily effected by slacking the nuts 70 and moving the studs along the slots 69.

The purpose of the baffle plate 67 is to arrest the forward and upward movement of the stems, whereby they are caused to fall down the lower inclined wall 62 and through the opening 65 into a receptacle 71 disposed beneath the said opening and supported by brackets 72 carried upon the frame of the machine.

73, 74 indicate fans disposed beneath the brush 21 and carried upon the outer ends of shafts 75, 76 journalled in bearings formed within a member 77 extending between and secured to the plates 4, 4ᵃ, the said shafts being provided at their inner ends with bevel pinions 78, 78 which engage with pinions 79, 79 disposed upon the shaft 80 journalled in bearings formed in the plates 4, 4ᵃ, and upon which shaft is mounted the pinion 16, motion being thereby transmitted to the fans from the main drive of the machine.

The function of the fans 73, 74 is to create a draught up through the body 60 of sufficient intensity to prevent any of the stripped leaf portion which passes into the body 60, and which is projected against the baffle plate 67, from returning down the inclined lower wall 62, and to cause it to be carried over the upper edge of the baffle plate and through the opening 66 to the receptacle 81.

The baffle 67ᵃ is as previously stated, in the form of a grid, and thus it in no way tends to interrupt the draught, the main function of the said baffle 67ᵃ being to prevent any stalk or stem portions from passing over the upper edge of the plate 67.

Instead of the body 60 being fixed to the plates 4, 4ᵃ it may be hingedly connected at its lower end thereto by means of plates such as 82 secured at their inner ends to the inner faces of the plates 4, 4ᵃ, the side walls 63, 64 of the body 60 being pivotally connected to the outer ends of the said plates as shown in Fig. 7.

The body 60 is held in position at its upper end by means of eye bolts 83 pivotally mounted at their inner ends upon the plates 4 and 4ᵃ and projecting at their outer ends through bodies such as 84 pivotally mounted upon the side walls 63, 64 of the body 60 the said bolts being provided with milled adjusting nuts 83ᵃ whereby the angle of the body 60 and consequently of the part 62 may be adjusted.

Fig. 8 shows an arrangement whereby not only the position of the baffle 67 may be adjusted longitudinally of the body 60 but the angle of the said baffle may also be varied as desired, and in such manner as to permit of the lower edge of the baffle 67 being maintained in contact with the part 62 of the body 60.

In order that this may be effected the baffle plate 67 is clamped by means of milled headed screws 85 within slots 86 formed within bodies 87 disposed within the body 60 and having at their outer ends screw threaded studs 88 which pass through the slots 69 of the walls 63 and 64 of the body 60 and are provided at their outer ends with clamping nuts such as 89.

By slacking the nuts 89 and the milled headed screws 85 it is possible to move the baffle plate to any desired position.

Claims:

1. In a machine for stripping or removing the leaf portions of tobacco from the stems, in combination, rollers adapted to feed the stem, rotary brushes preceding said feed rollers and running at a lower speed than said feed rollers, other rotary brushes succeeding said feed rollers and running at a higher speed than said feed rollers, a box like body, into which the stems and tobacco pass from the second brushes, said body comprising side and top members and an inclined bottom member, said body having therein an opening at the inner end thereof and an opening at the outer end thereof, a partition disposed transversely of said body and in spaced relationship to the ends and top thereof, and means for causing a current of air to pass through said body.

2. In a machine for stripping or removing the leaf portions of tobacco from the stems, in combination, rollers adapted to feed the stem, rotary brushes preceding said feed rollers and running at a lower speed than said feed rollers, other rotary brushes succeeding said feed rollers and running at a higher speed than said feed rollers, a box like body, into which the stems and tobacco pass from the second brushes, said body comprising side and top members and an inclined bottom member, said body having therein an opening at the inner end thereof and an opening at the outer end thereof, a partition disposed transversely of said body and in spaced relationship to the ends and top thereof, and air propelling means at the inner end of said body for causing a current of air to pass therethrough.

3. In a machine for stripping or removing the leaf portions of tobacco from the stems, in combination, rollers adapted to feed the stem, rotary brushes preceding said feed rollers and running at a lower speed than said feed rollers, other rotary brushes succeeding said feed rollers and running at a higher speed than said feed rollers, a box like body into which the stems and tobacco pass from the second brushes, said body comprising side and top members and an inclined bottom member, said body having therein an opening at the inner end thereof and an opening at the outer end thereof, a partition disposed transversely of said body and in spaced relationship to the ends and top thereof, means for adjusting the angle of said partition with respect to the inclined bottom of the body, and air propelling means for causing a current of air to pass through said body.

4. In a machine for stripping or removing the leaf portion of tobacco from the stems, in combination, rollers adapted to feed the stem, rotary brushes preceding said feed rollers and running at a lower speed than said feed rollers, other rotary brushes succeeding said feed rollers and running at a higher speed than said feed rollers, a box like body into which the stems and tobacco pass from the second brushes, said body comprising side and top members and an inclined bottom member, said body having therein an opening at the inner end thereof and an opening at the outer end thereof, a partition disposed transversely of said body and in spaced relationship to the ends and top thereof, and means for adjusting the angle of said partition with respect to the inclined bottom of the body and the position of said partition longitudinally of said body, and air propelling means for causing a current of air to pass therethrough.

5. In a machine for stripping or removing the leaf portions of tobacco from the stems, in combination, rollers adapted to feed the stem, rotary brushes preceding said feed rollers and running at a lower speed than said feed rollers, other rotary brushes succeeding said feed rollers and running at a higher speed than said feed rollers, a box like body into which the stems and tobacco pass from the second brushes, said body comprising side and top members and an inclined bottom member, said body having therein an opening at the inner end of said body, and an opening at the outer end thereof, a partition disposed transversely of said body and in spaced relationship to the ends and top thereof, a projection upon the inner face of said partition adjacent the upper end thereof, and air propelling means for causing a current of air to pass therethrough.

6. In a machine for stripping or removing the leaf portions of tobacco from the stems, in combination, rollers adapted to feed the stem, rotary brushes preceding said feed rollers and running at a lower speed than said feed rollers, other rotary brushes succeeding said feed rollers and running at a higher speed than said feed rollers, a box like body into which the stems and tobacco pass from the second brushes, said body comprising side and top members and an inclined bottom member, said body having therein an opening at the inner end thereof and an opening at the outer end thereof, a partition disposed transversely of said body and in spaced relationship to the ends and top thereof, a projection upon the inner face of said partition formed of air permeable material and disposed adjacent the upper end thereof and air propelling means for causing a current of air to pass therethrough.

7. In a machine for stripping or removing the leaf portions of tobacco from the stems, in combination, rollers adapted to feed the stem, rotary brushes preceding said feed rollers and running at a lower speed than said feed rollers, other rotary brushes succeeding said feed rollers and running at a higher speed than said feed rollers, a box like body into which the stems and tobacco pass from the second brushes, said body comprising side and top members and an inclined bottom member, said body having therein an opening at the inner end thereof, and an opening at the outer end thereof, a partition disposed transversely of said body and in spaced relationship to the ends and top thereof, and means for causing a current of air to pass through said body, and means for varying the inclination of said body.

8. In a machine for stripping or removing the leaf portions of tobacco from the stems, in combination, rollers adapted to feed the stem, rotary brushes preceding said feed rollers and running at a lower speed than said brushes, other rotary brushes succeeding said rollers and running at a higher speed than said feed rollers, a box like body into which the stem and tobacco pass from the second brushes, said body comprising side and top members and an inclined bottom member, said body having therein an opening at the inner end thereof and an opening at the outer end thereof, a partition disposed transversely of said body in spaced relationship to the ends and top thereof, means for adjusting the angle of said partition with respect to the bottom of the body and the position of said partition longitudinally of said body, a projection formed of air permeable material upon the inner face of said partition adjacent the upper end thereof, spindles at the inner end of said body, means for rotating said spindles and propellers upon said spindles whereby a current of air is caused to pass through said body.

In testimony whereof I have hereunto set my hand.

MORRIS GODFREY PHILIP PHILLIPS.